(12) United States Patent
Taki et al.

(10) Patent No.: US 11,592,099 B2
(45) Date of Patent: Feb. 28, 2023

(54) GEAR

(71) Applicant: Enplas Corporation, Saitama (JP)

(72) Inventors: Kenjiro Taki, Saitama (JP); Kazuyuki Sakamaki, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/476,527

(22) Filed: Sep. 16, 2021

(65) Prior Publication Data

US 2022/0090669 A1 Mar. 24, 2022

(30) Foreign Application Priority Data

Sep. 18, 2020 (JP) .............................. JP2020-157458

(51) Int. Cl.
 *F16H 55/17* (2006.01)
 *F16H 55/06* (2006.01)

(52) U.S. Cl.
 CPC ............. *F16H 55/17* (2013.01); *F16H 55/06* (2013.01); *F16H 2055/065* (2013.01)

(58) Field of Classification Search
 CPC ..... F16H 55/17; F16H 55/06; F16H 2055/065
 See application file for complete search history.

(56) References Cited

U.S. PATENT DOCUMENTS

| | | | | |
|---|---|---|---|---|
| 6,070,484 A | * | 6/2000 | Sakamaki | F16H 55/17 74/DIG. 10 |
| 2002/0021043 A1 | * | 2/2002 | Hagiwara | F16H 55/17 301/6.5 |
| 2002/0029648 A1 | * | 3/2002 | Noguchi | F16H 55/17 74/DIG. 10 |
| 2007/0283777 A1 | * | 12/2007 | Suzuki | F16H 55/17 74/434 |
| 2008/0092684 A1 | * | 4/2008 | Hagihara | F16H 55/0806 74/410 |
| 2021/0095751 A1 | * | 4/2021 | Stoppel | B29D 15/00 |

FOREIGN PATENT DOCUMENTS

| | | | | |
|---|---|---|---|---|
| CN | 103542068 A | * | 1/2014 | ............. F16H 55/17 |
| CN | 103542071 A | * | 1/2014 | ............. F16H 55/12 |
| JP | 3439317 | | 8/2003 | |

* cited by examiner

*Primary Examiner* — Terence Boes

(57) ABSTRACT

A gear includes: an outer circumferential rim provided integrally with a plurality of tooth portions disposed side-by-side in a circumferential direction on an outer circumferential surface; and a plurality of reinforcing ribs disposed inside the outer circumferential rim to be spaced from each other in the circumferential direction by thinning portions, wherein a position where each of the plurality of reinforcing ribs and the outer circumferential rim are joined corresponds, in the circumferential direction, to a position of a tooth groove between the plurality of tooth portions.

6 Claims, 12 Drawing Sheets

GEAR

CROSS REFERENCE TO RELATED APPLICATIONS

This application is entitled to (or claims) the benefit of Japanese Patent Application No. 2020-157458, filed on Sep. 18, 2020, the disclosure of which including the specification, drawings and abstract is incorporated herein by reference in its entirety.

TECHNICAL FIELD

The present invention relates to a gear.

BACKGROUND ART

Conventionally, in various mechanical devices, a speed reducer for decelerating and outputting input rotations. Such a speed reducer has, for example, a plurality of gears that mesh with each other.

A molded plastic gear, as shown in Patent Document 1, is known which is manufactured by injection molding and has a tooth portion on its outer periphery. Compared with metal gears, molded plastic gears have advantages such as low noise, excellent abrasion resistance, and chemical resistance, although their strength is possibly lower than metal gears, and in addition, they are lighter than metal gears, enabling mass production with precision molding.

CITATION LIST

Patent Literature

PTL 1: Japanese Patent No. 3439317

SUMMARY OF INVENTION

Technical Problem

Incidentally, when plastic molding is performed, it is known that the amount of shrinkage of resin at the time of becoming a molded product is larger in a thicker region than in a thin region.

Similarly, in the case of molding a molded plastic gear as a molded product, a predetermined wall thickness (e.g., about 2.5 mm) or more wall thickness, the shrinkage of resin is likely to cause voids (air gaps) and sinks (recesses).

Generally, to ensure the strength of molded plastic gears, the thickness of rim, which is a ring-shaped part integrally provided at a tooth root, should be larger than a tooth depth (1.2 times or more), as specified by ISO (International Organization for Standardization) and AGMA (American Gear Manufacturers Association), etc.

When an attempt is made to manufacture a large gear molded product by increasing the tooth depth, the rim thickness of the tooth depth will be set so as to satisfy the above-mentioned specifications in terms of strength. Thus, the wall thickness to be set becomes a predetermined wall thickness or more, and there is a problem that the strength reduction due to voids and accuracy reduction due to sinks is likely to occur. Accordingly, there is a need for a gear with a large tooth depth in even a molded plastic gear.

An object of the present invention is to provide a gear capable of increasing a size of a tooth having excellent accuracy, strength, and durability, even in a molded product.

Solution to Problem

An aspect of the gear according to the present invention, a gear has:

a ring-shaped outer circumferential rim integrally provided with a plurality of tooth portions disposed side-by-side in a circumferential direction on an outer circumferential surface; and a plurality of reinforcing ribs disposed inside the outer circumferential rim to be spaced from each other in the circumferential direction by a thinning portion, wherein a position where each of the plurality of reinforcing ribs and the outer circumferential rim are joined corresponds in the circumferential direction, to a position of a tooth groove between the plurality of tooth portions.

Advantageous Effects of Invention

According to the present invention, even in injection molded product, it is possible to provide a gear capable of increasing a size of a tooth having excellent accuracy, strength, and durability.

DESCRIPTION OF EMBODIMENTS

Hereinafter, embodiments of the present invention will be described in detail with reference to the accompanying drawings. Incidentally, the gear according to the embodiments to be described later is an example of a gear according to the present invention, the present invention is not limited by the embodiments.

Embodiment 1

Hereinafter, with reference to FIGS. 1 to 4, gear 1 according to the first embodiment of the present invention will be described.

Figure 1:
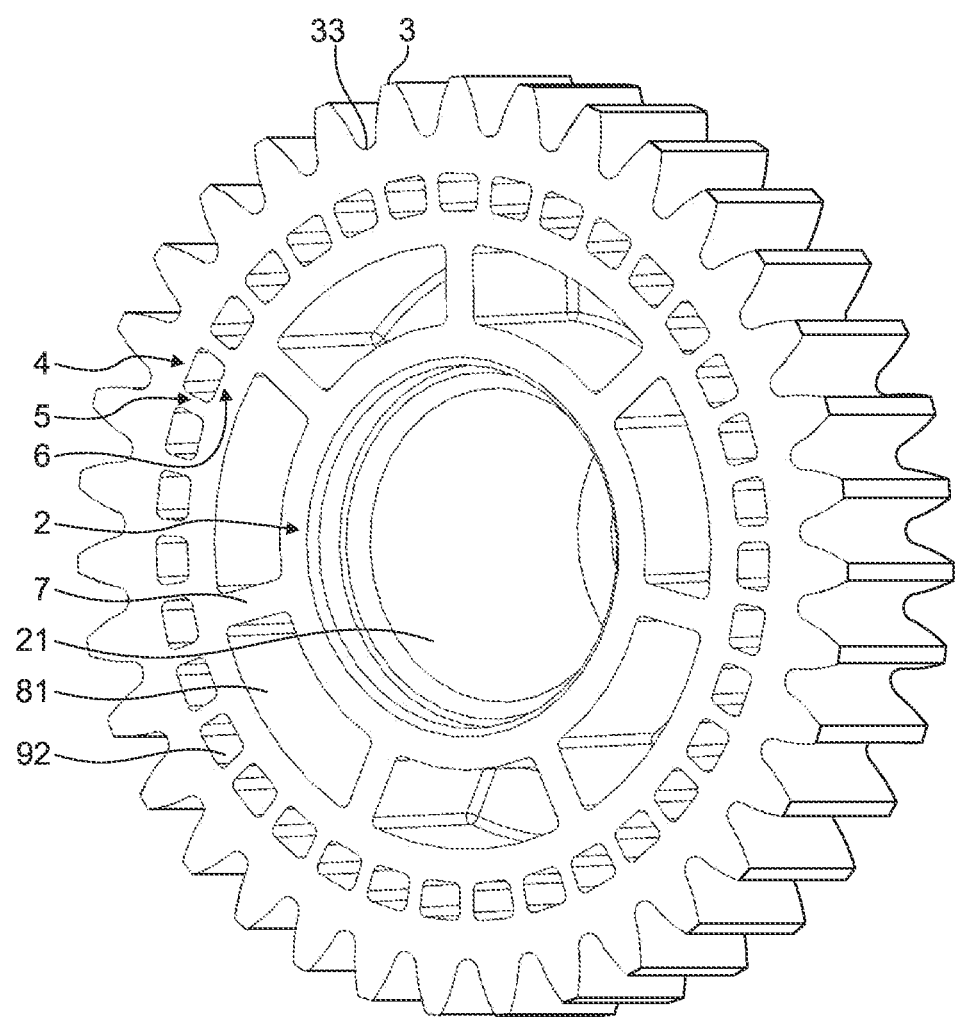
FIG. 1 is an external perspective view of a gear according to the first embodiment of the present invention.
Figure 2:
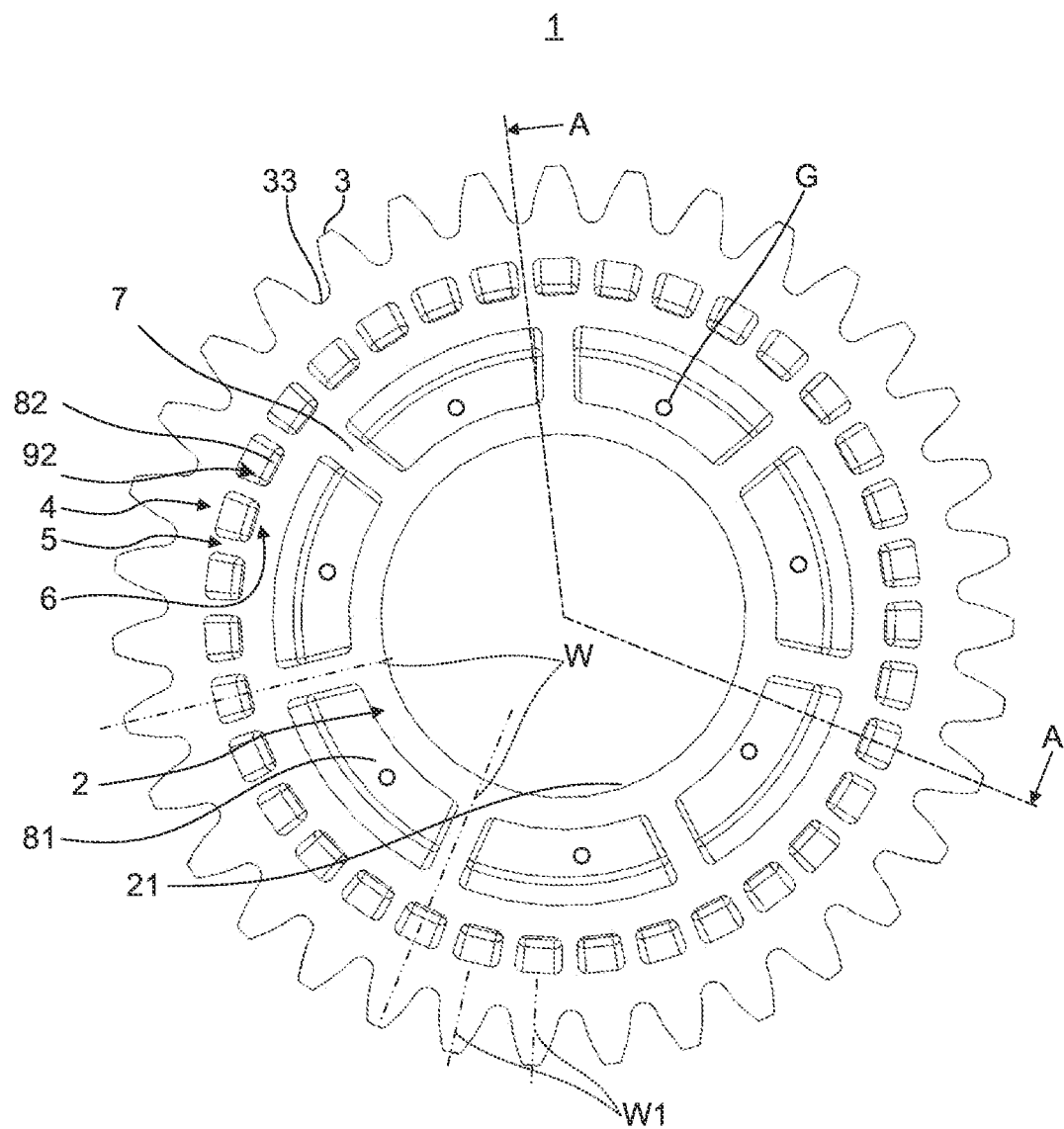
FIG. 2 is a front view of a gear according to the first embodiment of the present invention.
Figure 3:
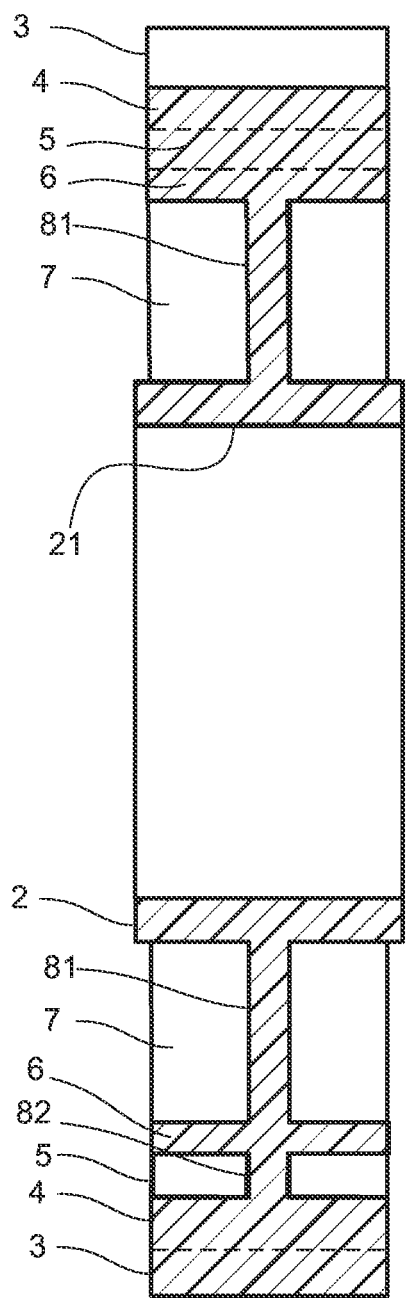
FIG. 3 is a cross-sectional view taken along line A-A in FIG. 2.

FIG. 1 is an external perspective view of a gear according to the first embodiment of the present invention, FIG. 2 is a front view of the gear according to the first embodiment of the present invention. Further, FIG. 3 is a cross-sectional view taken along line A-A in FIG.

In the following description of gear 1, the axial direction means a direction parallel to the central axis of gear 1 which is parallel to the tooth width direction. In addition, the radial direction means the radial direction of gear 1. The outside in the radial direction means the direction away from the center of gear 1 in the radial direction. The inside in the radial direction means the direction toward the center of gear 1 in the radial direction. Further, the circumferential direction means the circumferential direction of the circle about the central axis of gear 1.

<Gear>

Gear 1 corresponds to an example of a gear, a spur gear. Gear 1, while meshing with another gear is incorporated in a mechanical device, for example, such as a power slide door of an automobile.

Gear 1 has a disk shape made of synthetic resin and may be formed of a synthetic resin containing reinforcing fibers (e.g., glass fibers or carbon fibers) Further, gear 1 may be formed of metal.

Specifically, gear 1 integrally includes a plurality of tooth portions 3, ring-shaped outer circumferential rim 4, reinforcing ribs 5, inner circumferential rim 6 which is concentrically disposed on the inner circumferential side of the outer circumferential rim, inner circumferential side ribs 7, webs 81, 82, and annular portion 2 provided at the center. Annular portion 2 is a portion serving as an axis of gear 1, has an opening 21, and is a cylindrical body protruding in the axial direction.

Tooth portions 3 are integrally formed on the outer circumferential surface of outer circumferential rim 4. Tooth portions 3 are provided uniformly side by side in the circumferential direction to protrude radially outward from the outer circumferential surface of outer circumferential rim 4. A plurality of tooth portions 3, in this embodiment, are formed in parallel to the central axis of the boss as annular portion 2 of gear 1, thus gear 1 is a so-called spur gear.

Outer circumferential rim 4, on the outer circumferential surface, has a plurality of tooth portions 3, and tooth grooves 33 between the tooth portions 3 alternately in the circumferential direction, and has the same width as the tooth width of tooth portions 3 (thickness in the axial direction). Incidentally, the radial thickness of outer circumferential rim 4 is set to a thickness not to cause voids or sinks during molding (e.g., less than 2.5 mm).

On the inner circumferential side of outer circumferential rim 4, web 82 is joined, and on web 82, a plurality of reinforcing ribs 5 are disposed radially.

Reinforcing ribs 5 are disposed inside outer circumferential rim 4 to be spaced from each other in the circumferential direction by thinning portions 92. Reinforcing ribs 5, with respect to outer circumferential rim 4, are joined at a position corresponding to positions of tooth grooves 33 between the plurality of tooth portions 3 in the circumferential direction.

Reinforcing ribs 5 have the same width as outer circumferential rim 4 (thickness in the axial direction). Adjacent to the reinforcing ribs 5 in the circumferential direction, thinning portions 92 are disposed. Thinning portions 92 are formed by reinforcing ribs 5 and web 82 between outer circumferential rim 4 and inner circumferential rim 6. Thinning portions 92 are formed by openings in a direction parallel to the axial direction of annular portion 2. With reinforcing ribs 5 and thinning portions 92, the occurrence of voids or sinks on the inner circumferential side of outer circumferential rim 4 during molding is prevented.

The circumferential thickness of reinforcing ribs 5 is thinner than the radial thickness of outer circumferential rim 4. For example, the circumferential thickness of reinforcing ribs 5 is ⅓ to ⅔ of the thickness (rim thickness at a tooth root) of the radial direction of outer circumferential rim 4 (radial direction). Thus, while ensuring the strength of reinforcing ribs 5, it is possible to secure a molding die to reliably form a wall thinning by injection molding.

End of the center side of reinforcing ribs 5 (proximal end) is joined to inner circumferential rim 6. Here, reinforcing ribs 5 are disposed radially between outer circumferential rim 4 and inner circumferential rim 6, and respective outer ends and respective inner ends are joined to outer circumferential rim 4 and inner circumferential rim 6. Reinforcing ribs 5 are disposed in the circumferential direction and alternately with thinning portions 92 between outer circumferential rim 4 and inner circumferential rim 6.

Positions of reinforcing ribs 5 are located, with respect to which positions of tooth grooves 33 between the plurality of tooth portions 3 are located continuously in the radial direction via outer circumferential rim 4. Thus, reinforcing ribs 5 reinforce tooth grooves 33 which is subject to load when tooth portions 3 are meshed with tooth portions of another gear.

The positions of thinning portions 92 between the plurality of reinforcing ribs 5 correspond to the respective positions of the plurality of tooth portions 3 in the circumferential direction.

Specifically, thinning portions 92, in gear 1, are disposed at positions close to the tooth roots of the plurality of tooth portions 3 and with outer circumferential rim 4 located therebetween, i.e., at positions extending in the radial direction.

Since thinning portions 92 are located between reinforcing ribs 5, resin flowing through reinforcing ribs 5 from the inner circumferential side during molding merges in tooth portions 3 by bypassing thinning portions 92. For this reason, weld line W1 is formed to extend from thinning portions 92 into corresponding tooth portions 3.

Inner circumferential rim 6 is a ring-shaped body disposed concentrically with outer circumferential rim 4 and annular portion 2, and other configurations of inner circumferential rim 6 are the same as outer circumferential rim 4 except for that its radius is different from outer circumferential rim 4. For example, inner circumferential rim 6 has the same width (thickness in the axial direction) and thickness (thickness in the radial direction) as outer circumferential rim 4.

To inner circumferential rim 6, web 81 disposed between annular portion 2 on the inner circumferential side of inner circumferential rim 6 is connected. Web 81 is connected to inner circumferential rim 6 and annular portion 2, and on web 81, inner circumferential side ribs 7 are disposed to extend radially, and inner circumferential side ribs 7 joins annular portion 2 and inner circumferential rim 6.

Incidentally, the number of inner circumferential side ribs 7 is arbitrary, and inner circumferential side ribs 7 are disposed such that weld line W is not formed at tooth roots during molding with molten resin injected into a cavity of a molding die (not shown) from a gate (indicated by gate mark G). Weld line W is caused by that the molten resin is merged in the center between adjacent gates G, and is formed to extend linearly along the radial direction but not to be located on tooth grooves 33 in this embodiment.

Gate G is formed inside inner circumferential rim 6 and at a position continuous to inner circumferential rim 6. In this embodiment, webs 81 are formed such that, at each of webs 81 located between inner circumferential side ribs 7, a gate (indicated by gate mark G) is located.

In gear 1, at a central portion between gates G adjacent in the circumferential direction, inner circumferential side rib 7 is disposed. In the case of molding gear 1 by injection molding, the molten resin flowing into the cavity from the respective gates G, when merged with the molten resin from gate G adjacent in the circumferential direction, merges at inner circumferential side ribs 7, and then flows from the inner circumferential side of the gear to the outer circumferential side.

Operation and Effect of this Embodiment

Figure 4:
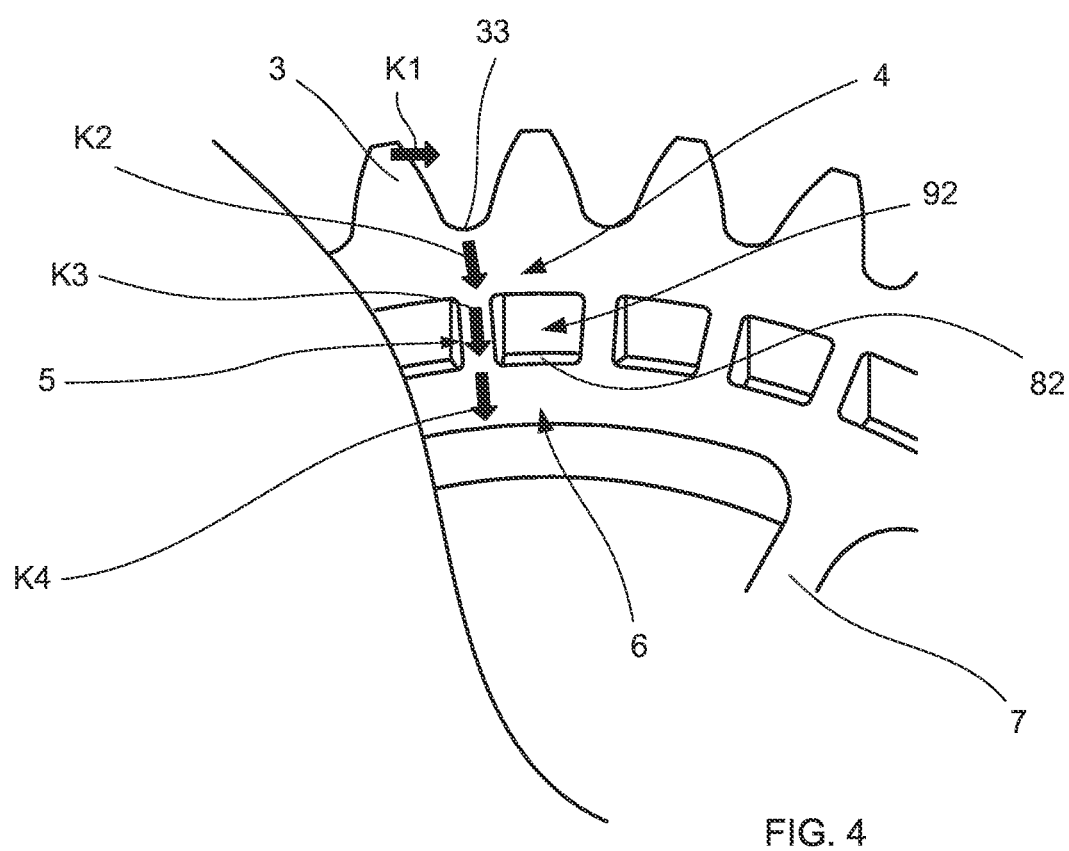
FIG. 4 is a diagram for providing a description of a gear according to the first embodiment of the present invention.

FIG. 4 is a diagram for providing a description of a gear according to the first embodiment of the present invention.

Gear 1 includes a ring-shaped outer circumferential rim 4 in which a plurality of tooth portions 3 provided side-by-side in the circumferential direction on the outer circumferential surface are provided integrally, and a plurality of reinforcing ribs 5 disposed inside the outer circumferential rim 4 to be spaced from each other in the circumferential direction by the thinning portion. A position where each of the plurality of reinforcing ribs 5 and outer circumferential rim 4 are joined corresponds, in the circumferential direction, to a position of each of tooth grooves 33 between the plurality of tooth portions 3. Further, inside outer circumferential rim 4, inner circumferential rim 6 is provided.

Thus, when gear 1 meshes with another gear and a load is applied to the tooth surfaces of tooth portions 3, a load is applied in the circumferential direction (arrow K1 direction) to tooth portions 3. Load applied in the circumferential direction to tooth portion 3 is propagated to tooth groove 33, passes through outer circumferential rim 4 from tooth groove 33 (the load direction is indicated by the arrow K2), propagates to the inside of the radial direction, and then to reinforcing rib 5 of which a joint position with outer circumferential rim 4 corresponds, in the circumferential direction, to tooth groove 33. The positions of tooth grooves 33 are located at positions which are continuous in the radial direction via outer circumferential rim 4 with respect to reinforcing ribs 5. Thus, reinforcing ribs 5 can suitably receive a load from tooth grooves 33 (the load direction is indicated by arrow K3), it is possible to suppress a large deformation of tooth portions 3.

Further, a load is applied to the joint with inner circumferential rim 6 from reinforcing rib 5, to generate a stress by this load (the load direction is indicated by arrow K4), it is possible to support the reinforcing ribs 5.

Thus, without thickening outer circumferential rim 4, it is possible to ensure the strength of outer circumferential rim 4 by reinforcing rib 5 as well as inner circumferential rim 6 and to suppress a large deformation of tooth portions 3.

Further, since a stress generating portion in inner circumferential rim 6 is disposed between inner circumferential side ribs 7, the load received by inner circumferential rim 6 is also propagated to inner circumferential side ribs 7, and it is possible to receive the load by inner circumferential side ribs 7 and annular portion 2.

Therefore, even if the circumferential thickness of outer circumferential rim 4 is thinner than a predetermined rim thickness corresponding to a size of tooth portions 3 (e.g., about 1.2 times or more of the tooth depth), it is possible to provide a gear capable of ensuring a sufficient strength. Thus, even if the gear is an injection molded product, a gear having excellent accuracy, strength, and durability and capable of increasing a size of teeth, i.e., a gear having a large tooth depth, is achieved.

Further, weld line W1 is formed to extend from thinning portions 92 of gear 1 into corresponding tooth portions 3. Thus, during molding, when the resin flows from the center of gear 1 to tooth grooves 33, a weld line reaching tooth grooves 33 is not formed, and it is possible to prevent a strength decrease due to the weld line and prevent damage in the vicinity of the tooth roots of tooth portions 3 in gear 1, to prevent a decrease in strength due to the weld line, the tooth portion 3 in the gear 1 it is possible to prevent damage in the vicinity of the tooth root, thereby ensuring rigidity.

Embodiment 2

Referring to FIGS. 5 to 8, the second embodiment according to the present invention will be described.

<Gear>

Figure 5:
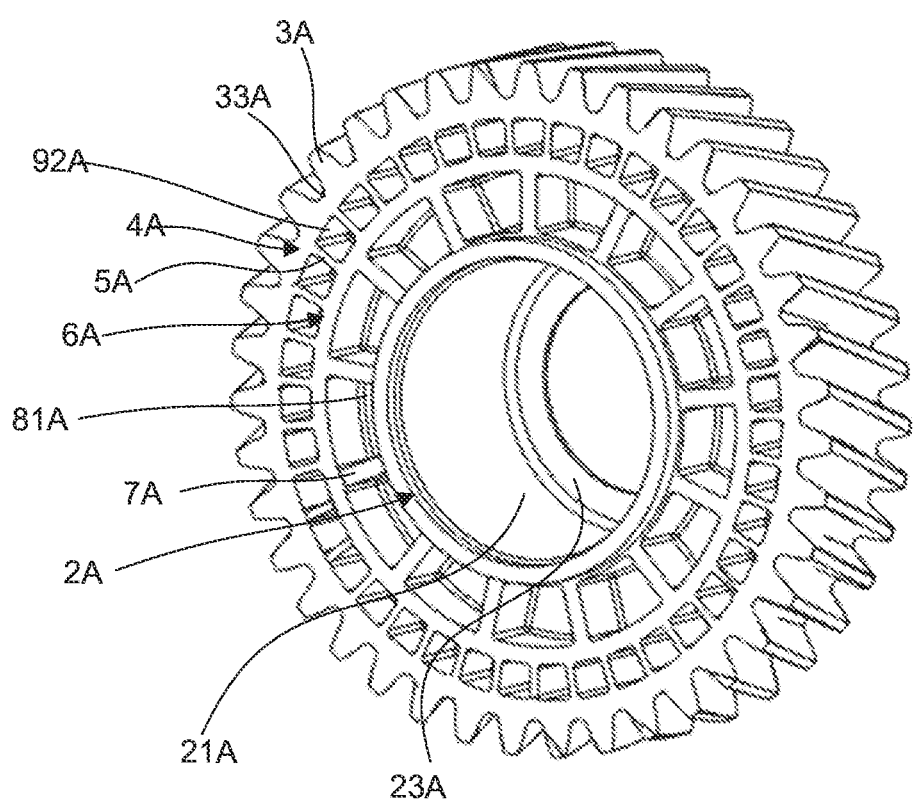
FIG. 5 is a forward perspective view of a gear according to the second embodiment of the present invention.
Figure 6:
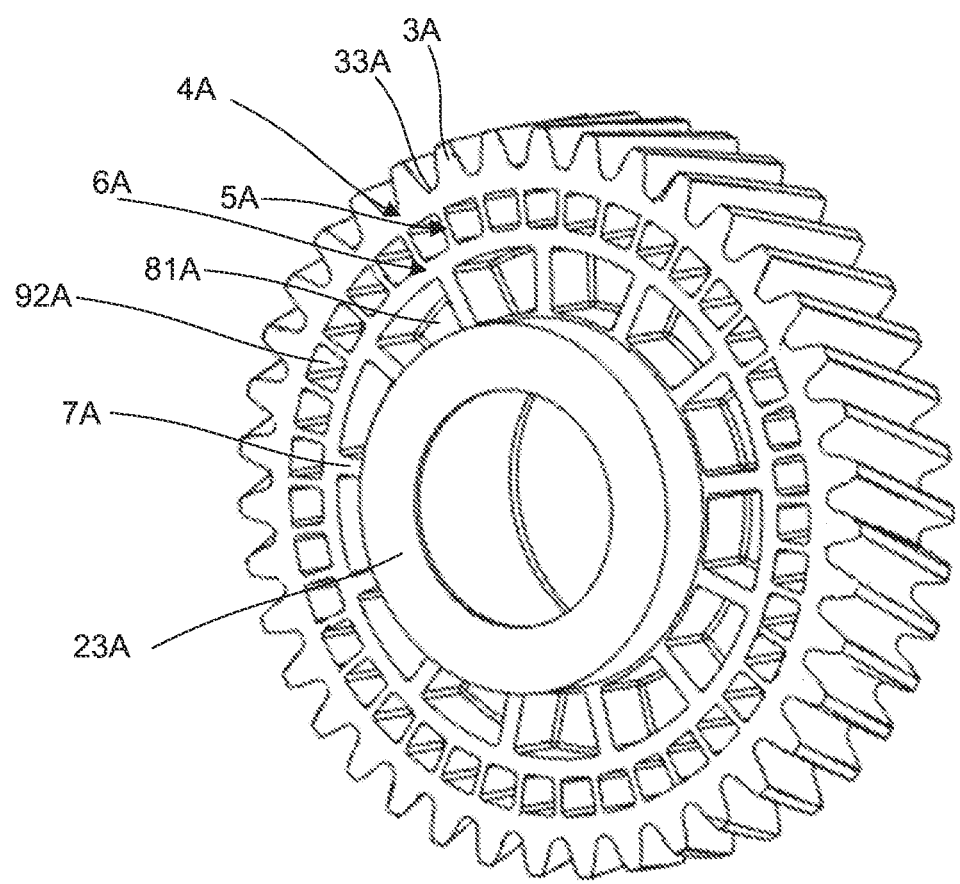
FIG. 6 is a rear perspective view of a gear according to the second embodiment of the present invention.
Figure 7:
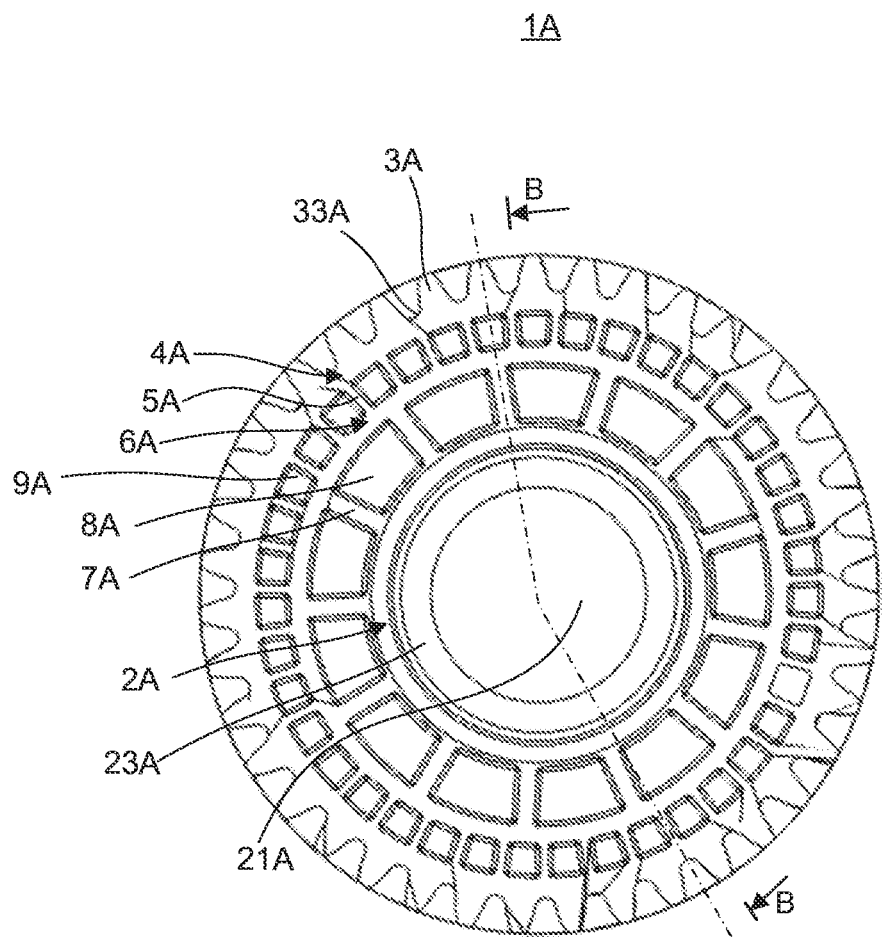
FIG. 7 is a front view of a gear according to the second embodiment of the present invention.
Figure 8:
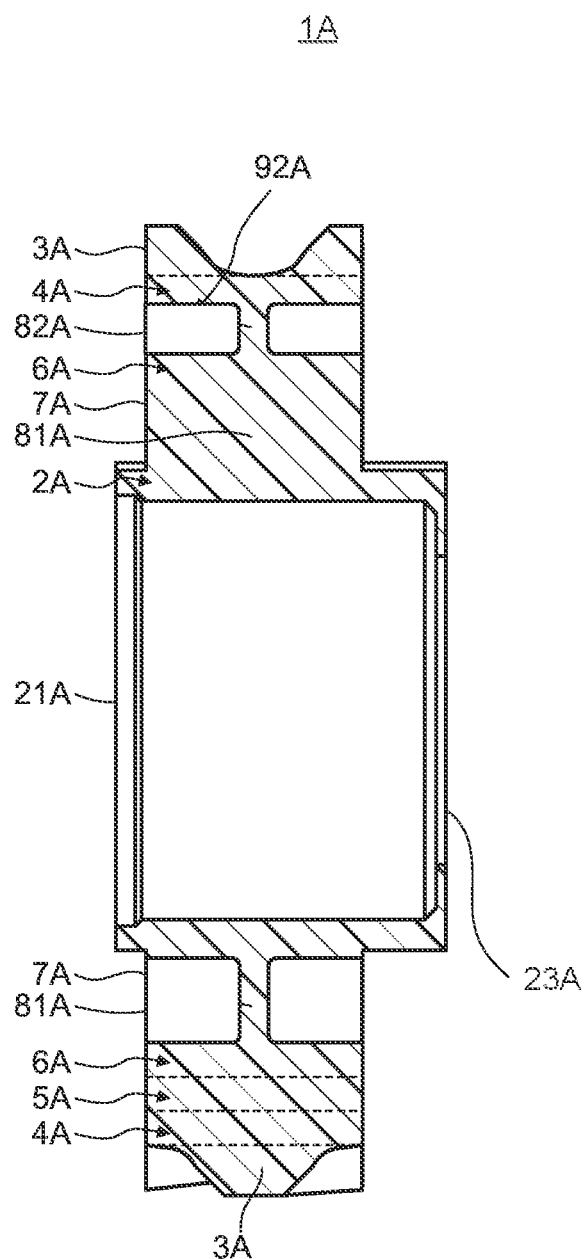
FIG. 8 is a sectional view taken along line B-B of FIG. 7.

FIG. 5 is a forward perspective view of a gear according to the second embodiment of the present invention, FIG. 6 is a rear perspective view of a gear according to the second embodiment of the present invention. Further, FIG. 7 is a front view of the gear according to the second embodiment of the present invention, FIG. 8 is a B-B cross-sectional view of FIG. 7.

In gear 1A, the structure of tooth portions 3A differs from tooth portions 3 of gear 1 according to the first embodiment. The other basic structure in gear 1A is the same as gear 1. Regarding the same structures as gear 1 in gear 1A, the same names are used as gear 1, the same reference numerals with "A" attached thereto are used, and explanations thereon will be omitted appropriately.

Gear 1A is a disc-shaped and made of synthetic resin. Gear 1A may be formed of a synthetic resin containing reinforcing fibers (e.g., glass fibers, carbon fibers), or a metal.

Specifically, gear 1A integrally includes a plurality of tooth portions 3A, ring-shaped outer circumferential rim 4A, reinforcing ribs 5A, inner circumferential rim 6A which is concentrically disposed on the inner circumferential side of outer circumferential rim 4A, inner circumferential side ribs 7A, webs 81A, 82A, and annular portion 2A provided at the center.

Tooth portions 3A are provided on the outer circumferential surface of outer circumferential rim 4A disposed uniformly side-by-side in the circumferential direction. Tooth portions 3A are disposed to protrude radially outward from the outer circumferential surface of outer circumferential rim 4A, and obliquely in the axial direction, i.e., they are a so-called helical gear.

Outer circumferential rim 4A constituting the outer circumferential portion of gear 1A has a plurality of tooth portions 3A being a helical gear, and tooth grooves 33A between tooth portions 3A, alternately in the circumferential direction on the outer circumferential surface. Outer circumferential rim 4A has the same width (axial direction thickness) as the tooth width of tooth portions 3.

At the inner circumferential side of outer circumferential rim 4A, web 82A is joined to the outer circumferential rim, and, on web 82A, a plurality of reinforcing ribs 5A are disposed to be spaced from each other in the circumferential direction by thinning portion 92A. Here, a plurality of reinforcing ribs 5A are disposed radially.

Tooth portions 3A are disposed obliquely in the tooth width direction, and both end portions in the tooth width direction of tooth portions 3A are located at positions shifted in the tooth width direction (axial direction).

A position where each of the plurality of reinforcing ribs 5A and outer circumferential rim 4A are joined corresponds, in the circumferential direction, to a position of each of tooth grooves 33A between the plurality of tooth portions 3A. Specifically, reinforcing ribs 5A are joined to outer circumferential rim 4A at positions corresponding to respective tooth grooves 33 extending obliquely in the tooth width direction and shifted in the tooth width direction, in respective surfaces on the front side and the rear side spaced apart from each other with respect to the web 82A in the axial direction (the same as the tooth width direction).

That is, in gear 1A, a plurality of tooth portions 3A are a helical gear extending obliquely in the tooth width direction, and a plurality of reinforcing ribs 5A are disposed to be spaced from each other in the respective circumferential direction of both surfaces spaced apart in the tooth width direction in outer circumferential rim 4A. A joining position of each of reinforcing ribs 5A and outer circumferential rim 4A corresponds, in the circumferential direction, to a position of tooth groove 33A between tooth portions 3A in each of the both surfaces (surfaces spaced apart in the tooth width direction) of gear 1A (outer circumferential rim 4A). Thus, in the helical gear having a width in the tooth width direction (axial direction) of gear 1A, the occurrence of thick portions that possibly become voids or sinks is prevented.

Reinforcing ribs 5A, when viewed from the front and rear sides, are joined to outer circumferential rim 4A such that tooth grooves 33A between the plurality of tooth portions 3A are aligned with the extension direction of reinforcing ribs 5A.

Reinforcing ribs 5 has the same width as outer circumferential rim 4A (axial direction thickness). Incidentally, thinning portions 92A are also alternately disposed with reinforcing ribs 5A in the circumferential direction on both sides of gear 1A and with web 82A disposed therebetween.

Thinning portions 92A are formed to open in the axial direction perpendicular to web 82A. Thinning portions 92A may be formed to open obliquely along a direction in which tooth portions 3A extends.

Inner circumferential rim 6A, similarly to inner circumferential rim 6 of gear 1, is joined to annular portion 2A via web 81A, and is joined to inner circumferential side ribs 7A disposed radially on web 81A.

Annular portion 2A is a cylindrical body, and annular bottom 23A is provided on one edge of opening 21A penetrating therethrough.

According to this embodiment, gear 1A is a helical gear, it is possible to achieve the same effect as gear 1. That is, even if the teeth in helical gear 1A are enlarged, it is possible to ensure strength without adapting the circumferential thickness of outer circumferential rim 4A to a thickness suited for large teeth. Also, even if the gear is a molded product, a gear having large teeth with sufficient accuracy, strength, and durability, i.e., a gear having teeth with a large tooth depth is achieved.

Embodiment 3

Referring to FIGS. 9 to 12, the third embodiment according to the present invention will be described.

Figure 9:
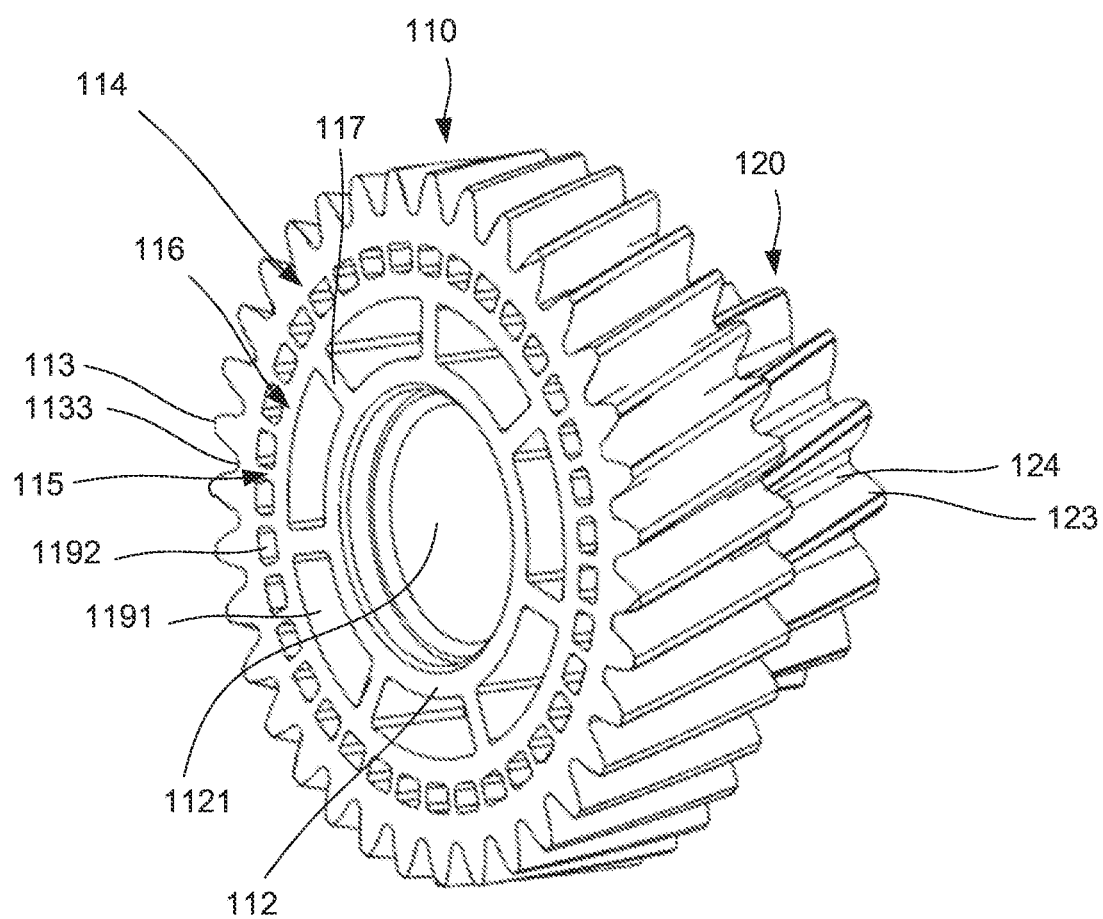
FIG. 9 is a forward perspective view of a gear according to the third embodiment of the present invention.
Figure 10:
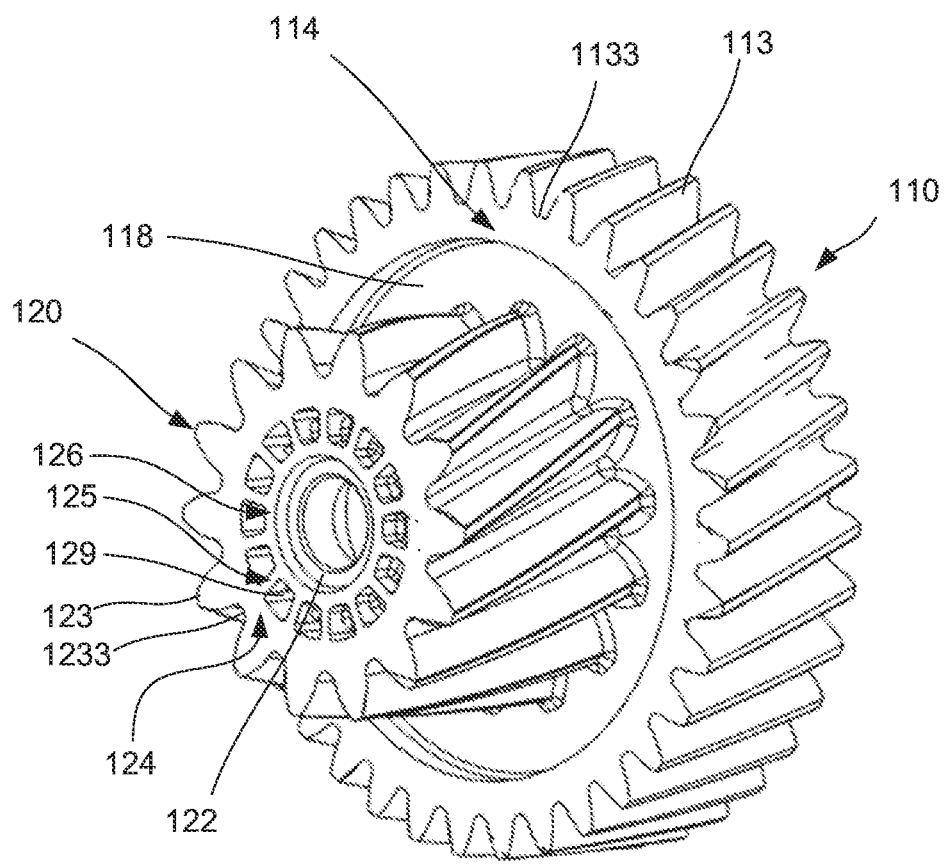
FIG. 10 is a rear perspective view of a gear according to the third embodiment of the present invention.
Figure 11:
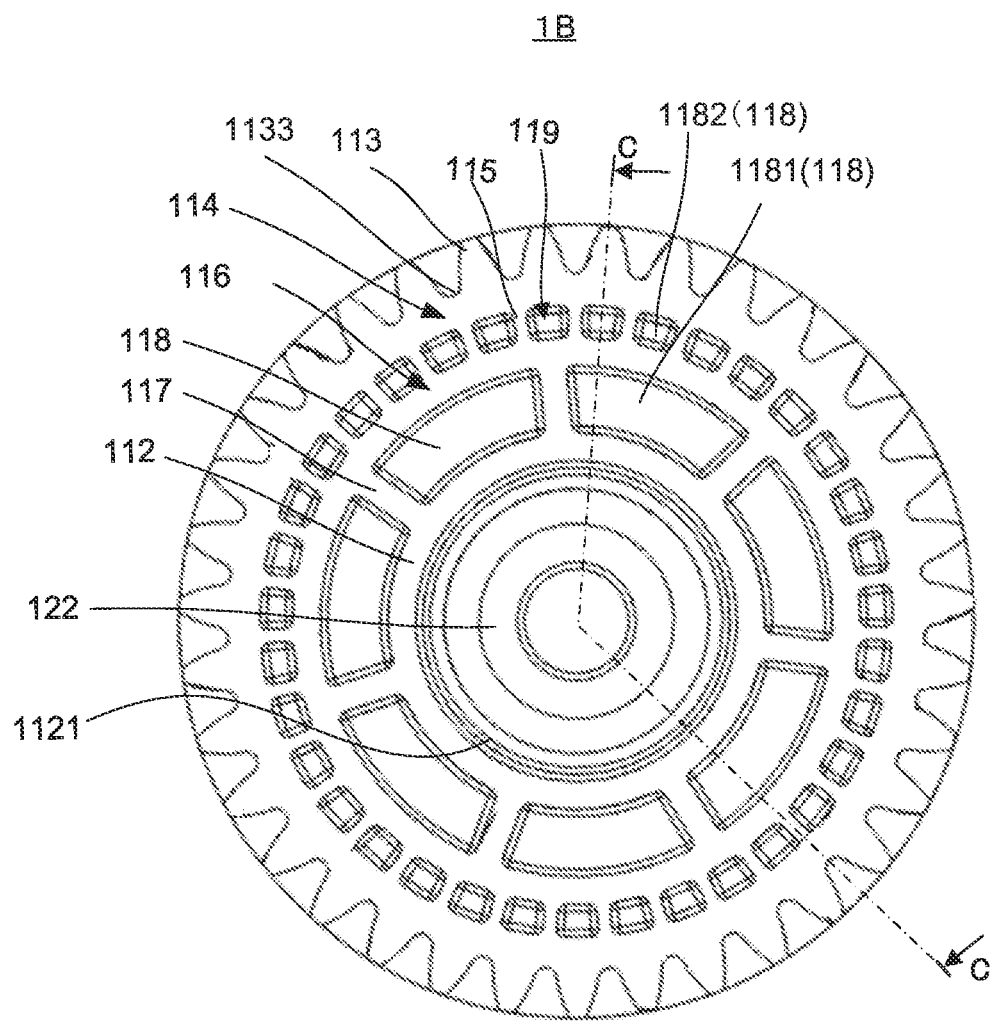
FIG. 11 is a front view of a gear according to the third embodiment of the present invention.
Figure 12:
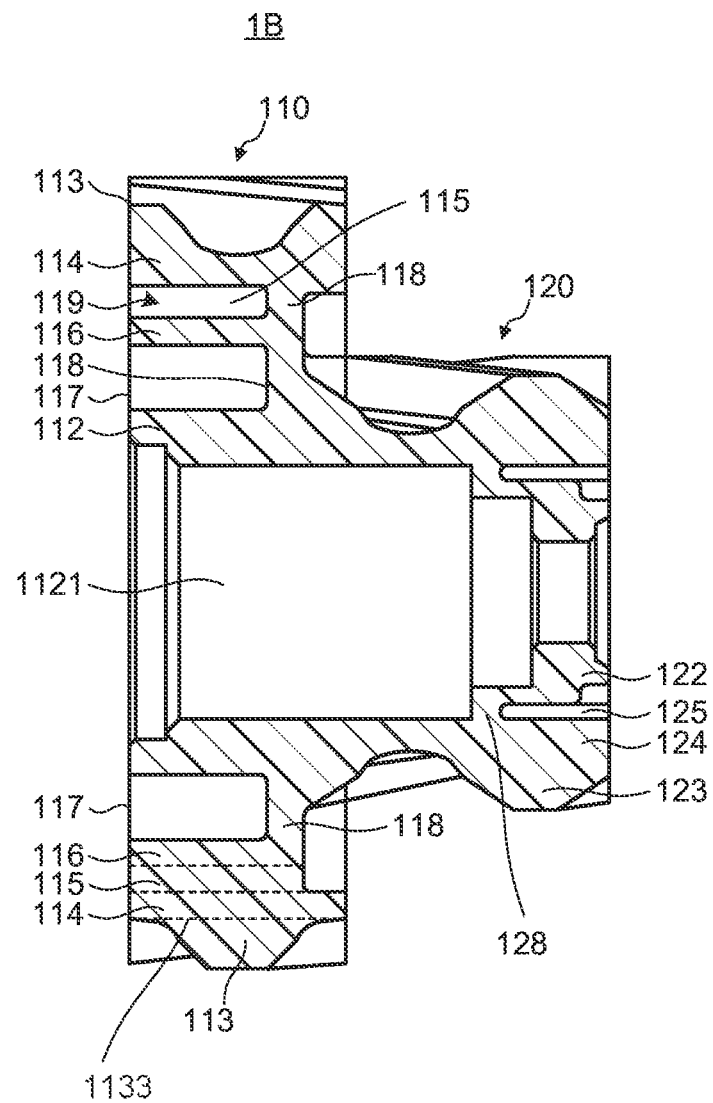
FIG. 12 is a cross-sectional view taken along line C-C of FIG. 11.

FIG. 9 is a forward perspective view of a gear according to the third embodiment of the present invention, FIG. 10 is a rear perspective view of a gear according to the third embodiment of the present invention. FIG. 11 is a front view of a gear according to the third embodiment of the present invention, FIG. 12 is a C-C cross-sectional view of FIG. 11.

Gear 1B is different from gear 1 and 1A according to the first and second embodiments, in that gear 1B has integrally and coaxially two stages including first gear portion 110 and second gear portion 120 while gear 1 and 1A are both a one-stage gear.

That is, gear 1B has disk-shaped gears made of a synthetic resin having different outer diameters including the first gear portion 110 and the second gear portion 120, coaxially and axially integrally.

First gear portion 110 and second gear portion 120 are helical gears, respectively.

In first gear portion 110 and second gear portion 120, respectively, a plurality of tooth portions 113, 123, ring-shaped outer circumferential rims 114, 124, reinforcing ribs 115, 125, and inner circumferential rims 116, 122 disposed concentrically on the inner circumferential side of outer circumferential rims 114, 124 are provided.

First gear portion 110 further includes inner circumferential ribs 117, web 118, and annular portion 112 provided at the center.

Annular portion 112 has opening 1121 which opens in the axial direction, and is provided continuously in the axial direction at the same axis as inner circumferential rim 122 of second gear portion 120. Opening 1121 of annular portion 112, and an opening at the center of inner circumferential rim 122 are provided continuously to each other and are an inner circumferential portion of a concentric circle, and a shaft portion serving as a rotation shaft of gear 1B (not shown) is inserted.

Similarly to gears 1 and 1A according to the first and second embodiments, on the outer circumferential side of annular portion 112, ring-shaped outer circumferential rim 114 to which a plurality of tooth portions 113 provided circumferentially side-by-side on the outer circumferential surface are integrally provided, a plurality of reinforcing ribs 115 joined to outer circumferential rim 114, and inner circumferential rim 116 are arranged.

Outer circumferential rim 114 joins to web 118 disposed between outer circumferential rim 114 and annual portion 112 and having thinner axial thickness than outer circumferential rim 114.

Similarly to outer circumferential rim 4A, outer circumferential rim 114 has a plurality of tooth portions 113 provided circumferentially side by side on the outer circumferential surface. Tooth portions 113 are provided on the outer circumferential surface of outer circumferential rim 114 to protrude radially outward from the outer circumferential surface, and to extend obliquely in the axial direction.

Thus, the outer circumferential surface of the outer circumferential rim 114, a tooth portion 113, and a tooth groove 1133 formed by the teeth 113 aligned in the circumferential direction are provided alternately in the circumferential direction. Incidentally, outer circumferential rim 114 has the same width as the tooth width of tooth portions 113 (thickness in the axial direction), and the radial thickness of outer circumferential rim 4A is a thickness to the extent that voids and sinks do not occur during manufacturing by injection molding.

Web 118 is provided to extend in the radial direction from the outer circumferential surface of annular portion 112. On one surface side of web 118 and at the inner side of outer circumferential rim 114, reinforcing ribs 115, inner circumferential rim 116, and inner circumferential side ribs 117 are provided from the outer circumferential side.

Reinforcing ribs 115 are disposed to be spaced from each other in the circumferential direction by thinning portion 119 inside outer circumferential rim 114. Reinforcing ribs 115 are radially disposed between outer circumferential rim 114 and inner circumferential rim 116.

Reinforcing ribs 115 has the same function as reinforcing ribs 5, 5A of the first and second embodiments, and a position where each of reinforcing ribs 115 and outer circumferential rim 114 are joined corresponds, in the circumferential direction, to a position of each of tooth grooves 1133 between the plurality of tooth portions 113.

First gear portion 110 is provided with reinforcing ribs 115 disposed on one side of the axial direction (the front side in this embodiment), and thinning portions 119 disposed to open. Reinforcing ribs 115 are located on web 118 such that tooth grooves 1133, when viewed from the front side, align with the extension direction of reinforcing ribs 115.

Between the plurality of reinforcing ribs 115, thinning portions 119 are provided, and between outer circumferential rim 114 and inner circumferential rim 116, reinforcing ribs 115 and thinning portions 119 are alternately disposed in the circumferential direction.

Further, on web 118 and between inner circumferential rim 116 and annular portion 112, inner circumferential side ribs 117 are provided to connect inner circumferential rim 116 and annular portion 112 with each other.

The function of inner circumferential side ribs 117 is the same as that of inner circumferential side ribs 7, 7A of gear 1, 1A.

Second gear portion 120 is provided with web 128 on the outer circumferential side of inner circumferential rim 122, and via web 128, inner circumferential rim 122 and concentric outer circumferential rim 124 are connected with each other.

On outer circumferential rim 124, a plurality of tooth portions 113 are disposed uniformly side by side in the circumferential direction on the outer circumferential surface to protrude radially outward from the outer circumferential surface and to extend obliquely in the axial direction.

On web 128, reinforcing ribs 125 are provided in the radial direction about inner circumferential rim 122, and to join inner circumferential rim 122 and outer circumferential rim 124 with each other.

Reinforcing ribs 125 are joined to outer circumferential rim 124 such that tooth grooves 1233 between tooth portions 123 are aligned with the extension direction of reinforcing ribs 125.

Between outer circumferential rim 124 and inner circumferential rim 122, reinforcing ribs 125 and thinning portions 129 are provided alternately in the circumferential direction.

Thus, in gear 1B, first gear portion 110 and second gear portion 120 mesh with other gears, respectively, and even when a load in the circumferential direction is applied to tooth portions 113, 123, the load can be received by reinforcing ribs 115, 125, as in the first embodiment. Furthermore, the load can also be received by inner circumferential rims 116, 122, thereby, even a gear as a molded product by injection molding can be a gear with a large tooth depth having excellent accuracy, strength, and durability, and it is possible to manufacture such a gear.

INDUSTRIAL APPLICABILITY

The present invention is applicable to various gears, and in particular, it is suitable for a resin gear with a large tooth depth.

REFERENCE SIGNS LIST 1, 1A, 1B gear
2, 2A, 112 annular portion
3, 3A, 113, 123 tooth portion
4, 4A, 114, 124 outer circumferential rim
5, 5A, 115, 125 reinforcing rib
6, 6A, 116 inner circumferential rim
7, 7A, 117 inner circumferential side rib
21, 21A, 1121 opening
23A Bottom portion
33, 33A, 1133, 1233 tooth groove
81, 81A, 82, 82A, 118, 128 web
122 inner circumferential rim (annular portion)
92, 92A, 119, 129 thinning portion
110 First gear portion
120 Second gear portion

The invention claimed is:

1. A gear comprising:
an outer circumferential rim provided integrally with a plurality of tooth portions disposed side-by-side in a circumferential direction on an outer circumferential surface; and
a plurality of reinforcing ribs disposed inside the outer circumferential rim to be spaced from each other in the circumferential direction by thinning portions,
wherein a position where each of the plurality of reinforcing ribs and the outer circumferential rim are joined corresponds, in the circumferential direction, to a position of a tooth groove between the plurality of tooth portions, and
wherein a weld line is formed to extend from one of the thinning portions into a corresponding tooth portion.

2. The gear according to claim 1, wherein the gear is a resin gear, and
positions of the thinning portions between the plurality of reinforcing ribs correspond, in the circumferential direction, to positions of the plurality of tooth portions.

3. The gear according to claim 1, wherein:
an inner circumferential rim is provided inside the outer circumferential rim,
outer ends of the plurality of inner circumferential side ribs extending radially from a central side are joined to the inner circumferential rim, and
each of the plurality of reinforcing ribs connects the outer circumferential rim and the inner circumferential rim with each other.

4. The gear according to claim 1, wherein the position of the tooth groove is located at a position continuous to a reinforcing rib in a radial direction via the outer circumferential rim.

5. The gear according to claim 1, wherein a circumferential thickness of the reinforcing ribs is ⅓ to ⅔ of a radial thickness of the outer circumferential rim, the radial thickness being a rim thickness of a tooth root.

6. A gear comprising:
an outer circumferential rim provided integrally with a plurality of tooth portions disposed side-by-side in a circumferential direction on an outer circumferential surface; and
a plurality of reinforcing ribs disposed inside the outer circumferential rim to be spaced from each other in the circumferential direction by thinning portions, wherein
the plurality of tooth portions are helical gears extending obliquely in a tooth width direction,
the plurality of reinforcing ribs are disposed to be spaced from each other in the circumferential direction of each of both surfaces spaced apart in a tooth width direction in the outer circumferential rim, and
a position where each of the plurality of reinforcing ribs and the outer circumferential rim are joined corresponds, in the circumferential direction, to a position of a tooth groove between the tooth portions in each of the both surfaces.

* * * * *